(12) United States Patent
Butuc et al.

(10) Patent No.: US 12,378,371 B2
(45) Date of Patent: Aug. 5, 2025

(54) STATOR COMPOUND HAVING AN AZIDE CURED ELASTOMERIC BASE AND STATORS AND DOWNHOLE MOTORS USING THE SAME

(71) Applicant: PV Fluid Products, Inc., Houston, TX (US)

(72) Inventors: Stefan Butuc, Houston, TX (US); Steve Kyker, Houston, TX (US); Victoria Perez, Houston, TX (US); Mike Salerno, Houston, TX (US)

(73) Assignee: PV Fluid Products, Inc., Houston, TX (US)

( * ) Notice: Subject to any disclaimer, the term of this patent is extended or adjusted under 35 U.S.C. 154(b) by 889 days.

(21) Appl. No.: 17/111,472

(22) Filed: Dec. 3, 2020

(65) Prior Publication Data
US 2021/0171724 A1 Jun. 10, 2021

Related U.S. Application Data

(60) Provisional application No. 62/943,795, filed on Dec. 4, 2019.

(51) Int. Cl.
| | |
|---|---|
| *C08J 3/22* | (2006.01) |
| *C08K 3/04* | (2006.01) |
| *C08K 5/00* | (2006.01) |
| *C08K 5/523* | (2006.01) |
| *F01C 21/10* | (2006.01) |

(52) U.S. Cl.
CPC ............ *C08J 3/22* (2013.01); *C08K 3/04* (2013.01); *C08K 5/0016* (2013.01); *F01C 21/104* (2013.01); *C08J 2400/26* (2013.01)

(58) Field of Classification Search
None
See application file for complete search history.

(56) References Cited

U.S. PATENT DOCUMENTS

| | | | |
|---|---|---|---|
| 3,507,829 | A | 4/1970 | Bostick et al. |
| 3,616,199 | A | 10/1971 | Breslow |
| 3,644,590 | A | 2/1972 | Coulthard |
| 3,864,305 | A | 2/1975 | Jordan et al. |
| 4,105,750 | A | 8/1978 | Horn et al. |
| 4,132,698 | A | 1/1979 | Gessler et al. |

(Continued)

FOREIGN PATENT DOCUMENTS

| | | | |
|---|---|---|---|
| CA | 1295065 | * | 1/1992 |
| EP | 0471250 A1 | | 2/1992 |

(Continued)

OTHER PUBLICATIONS

Hernandez, et al., "Effect of Different Cross-Linking Systems on Properties of Highly Saturated Nitrile Rubber Compounds," Journal of Applied Polymer Science, vol. 54 (1994), 1073-1078. (Year: 1994).*

(Continued)

*Primary Examiner* — Fred M Teskin
(74) *Attorney, Agent, or Firm* — Hitchcock Evert LLP

(57) ABSTRACT

A rubber compound including an azide cured elastomeric base, wherein the rubber compound is used to form an elastomeric component of a downhole tool. The rubber compound is comprised of at least one elastomeric component and at least one diazide curing agent.

33 Claims, 3 Drawing Sheets

(56) References Cited

U.S. PATENT DOCUMENTS

| | | | |
|---|---|---|---|
| 4,657,938 | A | 4/1987 | Fithian et al. |
| 5,098,941 | A | 3/1992 | Tsuriya |
| 5,756,586 | A | 5/1998 | Nishimura et al. |
| 6,102,681 | A | 8/2000 | Turner |
| 7,959,726 | B2 | 6/2011 | Gaudet |
| 8,316,904 | B2 | 11/2012 | Soeda et al. |
| 8,944,789 | B2 | 2/2015 | Butuc et al. |
| 9,016,659 | B2 | 4/2015 | Huang |
| 9,796,834 | B2 | 10/2017 | Kyker |
| 9,796,835 | B2 | 10/2017 | Kyker |
| 9,938,829 | B2 | 4/2018 | Cariveau et al. |
| 9,988,513 | B2 | 6/2018 | Kyker |
| 10,215,176 | B2 | 2/2019 | Cariveau et al. |
| 10,385,694 | B2 | 8/2019 | Cariveau et al. |
| 10,442,916 | B2 | 10/2019 | Kyker |
| 10,837,874 | B2 | 11/2020 | Cariveau et al. |
| 10,934,778 | B2 | 3/2021 | Lu et al. |
| 11,015,603 | B2 | 5/2021 | Cariveau et al. |
| 11,421,533 | B2 | 8/2022 | Cariveau et al. |
| 11,542,944 | B2 | 1/2023 | Cariveau et al. |
| 11,566,120 | B2 | 1/2023 | Bohmer |
| 11,661,972 | B2 | 5/2023 | Lu et al. |
| 11,692,911 | B2 | 7/2023 | Cariveau et al. |
| 11,806,902 | B2 | 11/2023 | Cariveau |
| 11,808,153 | B2 | 11/2023 | Cariveau et al. |
| 11,815,139 | B2 | 11/2023 | Lu et al. |
| 11,885,333 | B2 | 1/2024 | Cariveau et al. |
| 2005/0101737 | A1 | 5/2005 | Pazur et al. |
| 2008/0050259 | A1 | 2/2008 | Hooper |
| 2010/0098569 | A1 | 4/2010 | Robisson et al. |
| 2015/0022051 | A1 | 1/2015 | Meng et al. |
| 2015/0203668 | A1 | 7/2015 | Bédard et al. |
| 2015/0233373 | A1 | 8/2015 | Sicilian |
| 2016/0272793 | A1 | 9/2016 | Bédard et al. |
| 2020/0238580 | A1 | 7/2020 | Cariveau |
| 2020/0271167 | A1 | 8/2020 | Lu et al. |
| 2021/0080355 | A1 | 3/2021 | Cariveau et al. |
| 2021/0190148 | A1 | 6/2021 | Lu et al. |
| 2023/0167280 | A1 | 6/2023 | Bohmer |
| 2024/0044251 | A1 | 2/2024 | Cariveau et al. |

FOREIGN PATENT DOCUMENTS

| | | | | |
|---|---|---|---|---|
| EP | 0344380 | B1 | 2/1995 | |
| EP | 0692519 | B1 | 12/2000 | |
| EP | 0246745 | B2 | 1/2001 | |
| EP | 1380604 | B1 | 1/2008 | |
| EP | 2217452 | B1 | 4/2011 | |
| FR | 3028517 | A1 * | 5/2016 | ............... C08K 5/28 |
| WO | 0216441 | A1 | 2/2002 | |
| WO | WO2009/071122 | A1 * | 6/2009 | ............... C08K 5/28 |
| WO | 2010014275 | A2 | 2/2010 | |

OTHER PUBLICATIONS

Response to Restriction Requirement filed in U.S. Appl. No. 14/941,240 dated Apr. 28, 2016.
Restriction Requirement received in U.S. Appl. No. 14/941,240 dated Apr. 14, 2016.
Non-Final Office Action received in U.S. Appl. No. 14/941,240 dated Jun. 20, 2016.
Response to Non-Final Office Action filed in U.S. Appl. No. 14/941,240 dated Jul. 13, 2016.
Final Office Action received in U.S. Appl. No. 14/941,240 dated Aug. 18, 2016.
Request for Continued Examination and Amendment filed in U.S. Appl. No. 14/941,240 dated Jan. 18, 2017.
Non-Final Office Action received in U.S. Appl. No. 14/941,240 dated Apr. 12, 2017.
Response to Non-Final Office Action filed in U.S. Appl. No. 14/941,240 dated Jul. 12, 2017.
Supplemental Amendment filed in U.S. Appl. No. 14/941,240 dated Aug. 1, 2017.
Notice of Allowance received in U.S. Appl. No. 14/941,240 dated Sep. 13, 2017.
Non-Final Office Action received in U.S. Appl. No. 15/414,488 dated Mar. 28, 2017.
Response to Non-Final Office Action filed in U.S. Appl. No. 15/414,488 dated Jun. 28, 2017.
Notice of Allowance received in U.S. Appl. No. 15/414,488 dated Jul. 24, 2017.
Non-Final Office Action received in U.S. Appl. No. 15/414,494 dated Mar. 24, 2017.
Response to Non-Final Office Action filed in U.S. Appl. No. 15/414,494 dated Jun. 26, 2017.
Final Office Action received in U.S. Appl. No. 15/414,494 dated Sep. 26, 2017.
Request for Continued Examination and Amendment filed in U.S. Appl. No. 15/414,494 dated Dec. 26, 2017.
Notice of Allowance received in U.S. Appl. No. 15/414,494 dated Feb. 2, 2018.
Non-Final Office Action received in U.S. Appl. No. 15/985,117 dated Nov. 2, 2018.
Response to Non-Final Office Action filed in U.S. Appl. No. 15/985,117 dated Feb. 12, 2019.
Notice of Allowance received in U.S. Appl. No. 15/985,117 dated Jun. 5, 2019.
Zielinska, Agata Joanna, "Cross-Linking and Modification of Saturated Elastomers Using Functionalized Azides", Dissertation, Jul. 1, 2011.
Paul Rau, Nipol NBR Elastomers Overview, Symposium, Sep. 19, 2006.
Ataman Cheminal product brochure for zinc stearate (2000) pp. 1-6. (Year: 2000).

* cited by examiner

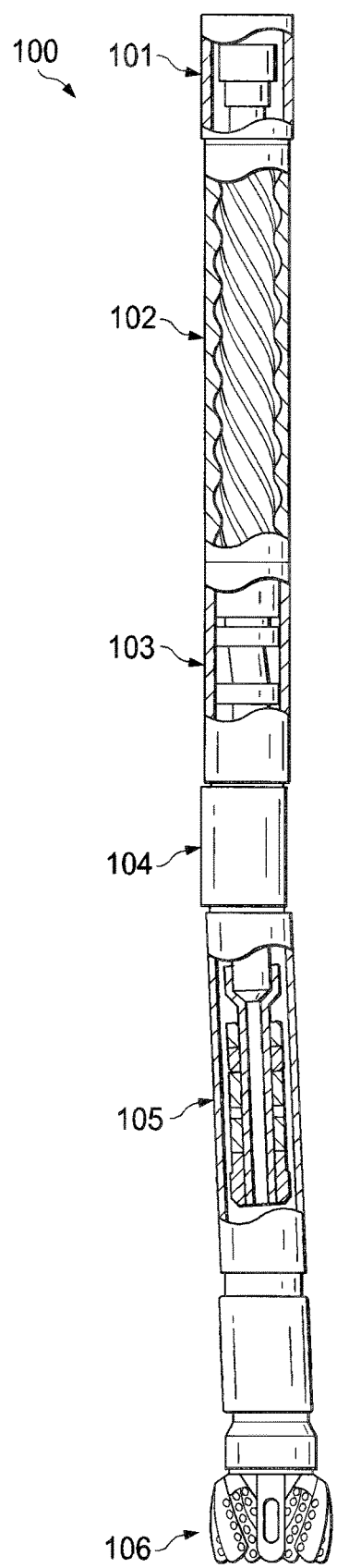
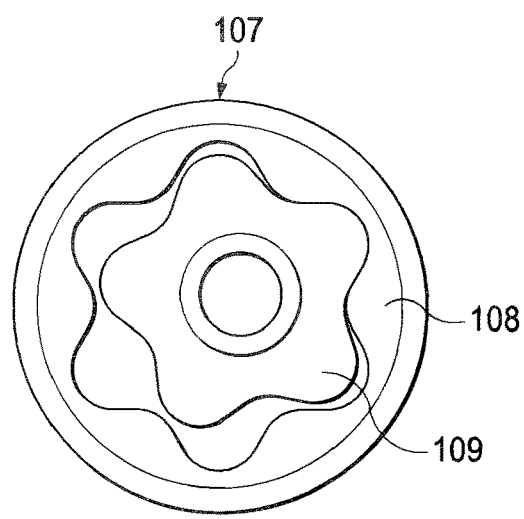
FIG. 1A
FIG. 1B

STATOR COMPOUND HAVING AN AZIDE CURED ELASTOMERIC BASE AND STATORS AND DOWNHOLE MOTORS USING THE SAME

RELATED APPLICATION

This application claims the benefit of U.S. Provisional Application No. 62/943,795 filed Dec. 4, 2019, which is incorporated by reference herein for all purposes.

FIELD OF INVENTION

The present invention relates to stator liners for motors and pumps for downhole applications in oil and gas wells.

BACKGROUND OF INVENTION

In oil and gas drilling industry, downhole motors and pumps are frequently used in a number of different downhole applications when drilling, completing or working over oil and gas wells. For example, downhole motors are useful in directional drilling, which requires steering a drill bit to form well bores that deviate from vertical. Rather than, or in addition to, using a rotary table or top drive to turn a drill string that, in turn, rotates a drill bit, a downhole motor is placed between the end of the drill string and the drill bit to rotate the drill bit. Although electric and other types of motors could be used, the most common type of motor is a so-called "mud motor" which is powered by pumping drilling fluid—"mud" in the jargon of the oilfield—under high pressure and at high volumes through the drill string to the motor.

Most, if not all, mud motors are a type of positive displacement pump, and in particular a progressive cavity positive displacement pump. A progressive cavity, positive displacement motor or pump has an outer portion called a "stator," which is not intended to rotate relative to the drill string or other structure in which it is placed, and an inner portion called a "rotor," which rotates relative to the stator and is coupled to a rotational input or output. Pushing fluid through the pump causes rotation of the rotor, thus turning the pump into a motor when drilling fluid is pumped down the drill string. However, the same or similar structure can be used to pump fluid by rotating the rotor.

Mud motors typically have three sections: a sub for connecting to the drill string, a power section, and a transmission. The outer housing of the power section, which is roughly the same diameter of the drill pipe making up the drill string, comprises part of the stator. It is coupled with the drill string so that it does not rotate relative to the drill string. The rotor is disposed within the stator. The stator is comprised of helical internal bore contacting lobes. The rotor is also helically shaped with external contacting globes. It is positioned to rotate inside the stator. The outer surface of the rotor and the inner surface of the stator cooperate to form hollow chambers between their contact points in which fluid can be held. Rotation of the rotor causes the chambers to advance from one end of the stator towards the other end, thus carrying trapped fluid from one end of the power section to the other. The rotor is, in turn, coupled with a transmission, which converts the eccentric, rotational motion of the end of rotor into purely rotational motion that can be used as a rotational input to a tool such as a drill bit or, if used as a fluid pump, to a rotational output of a motor.

Stators are comprised of an elastomeric inner lining that forms a bore with the necessary helical shaped lobes. The elastomeric inner lining is formed by injecting the elastomer into a mold. The power sections and progressive cavity pumps are injection molded from an injectable uncured elastomer that fills the long stator tube during injection molding. Once the tube is filled, it is cured in an oven, autoclave or cure bath. The injection molding process requires low viscosity materials, which can limit the modulus and resilience of the cured compound. In operation elastomeric stator liners of progressive cavity positive displacement pumps and motors are subjected to not only substantial mechanical stresses but also to stresses imposed by exposure to the drilling fluid and high downhole temperatures. The elastomeric part of the stators are a cause of most downhole failures of mud motors and pumps. Even though mud motors have been used in the oil and gas drilling industry for many years, lasting stator liners for downhole applications remains a significant challenge, particularly for high-stress operating conditions often encountered in shale oil drilling operations.

Nitrile rubbers (NBR) and hydrogenated nitrile rubbers (HNBR) are some of the types of elastomers for use in stator linings. NBR is an elastomeric compound formed from the polymerization of acrylonitrile and butadiene. HNBR is another elastomer used to form stator linings. HNBR is formed by hydrogenation of NBR in which some portion or all of the residual carbon to carbon double bonds remaining after polymerization of the monomers has been hydrogenated. Other elastomers that have been used for stator linings include nitrile terpolymer rubbers and hydrogenated nitrile terpolymer rubbers. Nitrile terpolymer rubbers being rubbers formed by polymerization of acrylonitrile, butadiene, and another diene. One diene used as a monomer for formation of nitrile terpolymer rubber is isoprene. This type of nitrile terpolymer is referred to as nitrile butadiene isoprene rubber (NBIR). NBIR can also be hydrogenated to reduce some or all of the residual double bonds remaining after polymerization to produce hydrogenated nitrile isoprene rubber (HNBIR). Likewise, other nitrile terpolymer rubbers that are made from a third monomer unit other than isoprene may be hydrogenated to produce their hydrogenated counterparts. In particular, NBR, HNBR, nitrile terpolymer rubber, and hydrogenated nitrile terpolymer rubber elastomers have been used as a rubber base for stator liners that possess better physical properties in comparison to stator liners made from other types of rubber bases. The physical and chemical resistance properties of these elastomers make them useful as rubber bases for compounds from which to mold stator liners (stator compounds).

Other rubbers that have been or have been proposed for use as rubber bases for stator compounds include: fluoroelastomer rubber (FKM) formed from vinylidene fluoride monomers and other monomers, such as hexafluoropropylene, tertrafluoroethylene, perfluoromethylvinylether, propylene, and ethylene; chloroprene rubber or chlorobutadiene rubber (CR) formed from the monomer 2-chlorobuta-1,3-diene; ethylene propylene diene monomer rubber (EPDM); and epichlorohydrin rubbers (ECO).

In addition to the type of elastomer used in the stator compound, the crosslinking agent used to crosslink the elastomer can have an on the physical and chemical properties of the final stator compound. Crosslinking agents that have been used for stator compounds include sulfur-based agents and peroxide based agents. Sulfur is the most common agent used to crosslink stator compounds.

Peroxide curing agents are an alternative to sulfur crosslinking agents and have been used to cure the polymeric elastomer bases in stator compounds. Generally, peroxide crosslinking systems result in a final rubber component of a stator line that has greater heat aging resistance than sulfur-cured rubber. In addition, unlike, sulfur curing systems, peroxide curing systems may be used to cure elastomers that do not have main chain double bonds, such a fully hydrogenated nitrile rubber.

Peroxide curing, however, has certain limitations and drawbacks. For example, peroxide cured elastomers often present poor dynamic properties, increased flex fatigue, and a greater likelihood of scorching during curing.

In addition to one or more cross linking agents, a curing system for a polymeric elastomer base of a stator compound may include other components that facilitate curing. These other components include curing accelerators, examples of which include amines, thizoles, sulphenamides, dithiocarbamates, and thiurams. The use of these and other accelerators, as well as other additives, can provide a higher state of cure, increase scorch safety, and improve heat aging resistance.

A stator compound may also include, in addition to one or more elastomers that form its elastomeric base and the components of the curing system, a number of other additives such as fillers and plasticizers, which affect the physical and chemical properties of the final stator liner.

While the process for making stators for progressive cavity pumps and stators for progressive cavity motors are similar, the desired parameters of the elastomers are not. Both need good processability such as low viscosity in uncured state and long scorch safety, good chemical resistance, and good dynamic properties. However, the elastomer used for stator motors should have a much higher modulus. This allows for better power output. On the other hand, an elastomer used to make stator for a progressive activity motor preferably has a lower modulus but higher elongation. This allows for long term resistance (months or years) to heat aging and dynamic fatigue.

SUMMARY

The inventors have recognized that stator compounds with polymeric rubber bases crosslinked using sulfur as the crosslinking agent often show relatively poor heat aging resistance. Furthermore, it is not possible to use sulfur to cure polymeric elastomers that do not contain any residual double bonds, such as fully hydrogenated nitrile rubbers.

The embodiments of a stator compound disclosed below, which comprise an elastomeric base and a diazide curing agent, result in improvements to one or more properties of a stator liner formed from the stator compound, resulting in better performance of the stator liner in downhole applications and other applications with conditions similar to at least some of the conditions encountered downhole in oil and gas well bores.

In one embodiment, a stator compound is comprised of an elastomer base and a diazide crosslinking agent. The elastomer base may comprise one or more rubber polymers chosen from a group consisting of NBR, HNBR, NBIR, HNBIR, nitrile terpolymer rubber, hydrogenated nitrile terpolymer rubber, FKM, CR, EPDM, and ECO. Other components may be added with the elastomeric base to form the stator compound, either before or during curing, to improve the physical and chemical resistance properties of the of the stator liner. Examples of such components include fillers, such as carbon black, silica clay, etc; plasticizers, such as C-par paraffin or triphenyl phosphate:

These rubber compounds may also improve the performance of elastomeric based components (not limited to stators) in motors and pumps used for other applications involving fluid transfer.

BRIEF DESCRIPTION OF DRAWINGS

For a more complete understanding of the present invention, and the advantages thereof, reference is now made to the following descriptions taken in conjunction with the accompanying drawings, in which:

FIG. 1A is a perspective view of a non-limiting example of a downhole motor having a stator liner made from a stator compound disclosed herein.

FIG. 1B is a top cross-sectional view of the rotor and stator assembly of FIG. 1A.

DETAILED DESCRIPTION

Figure 2:
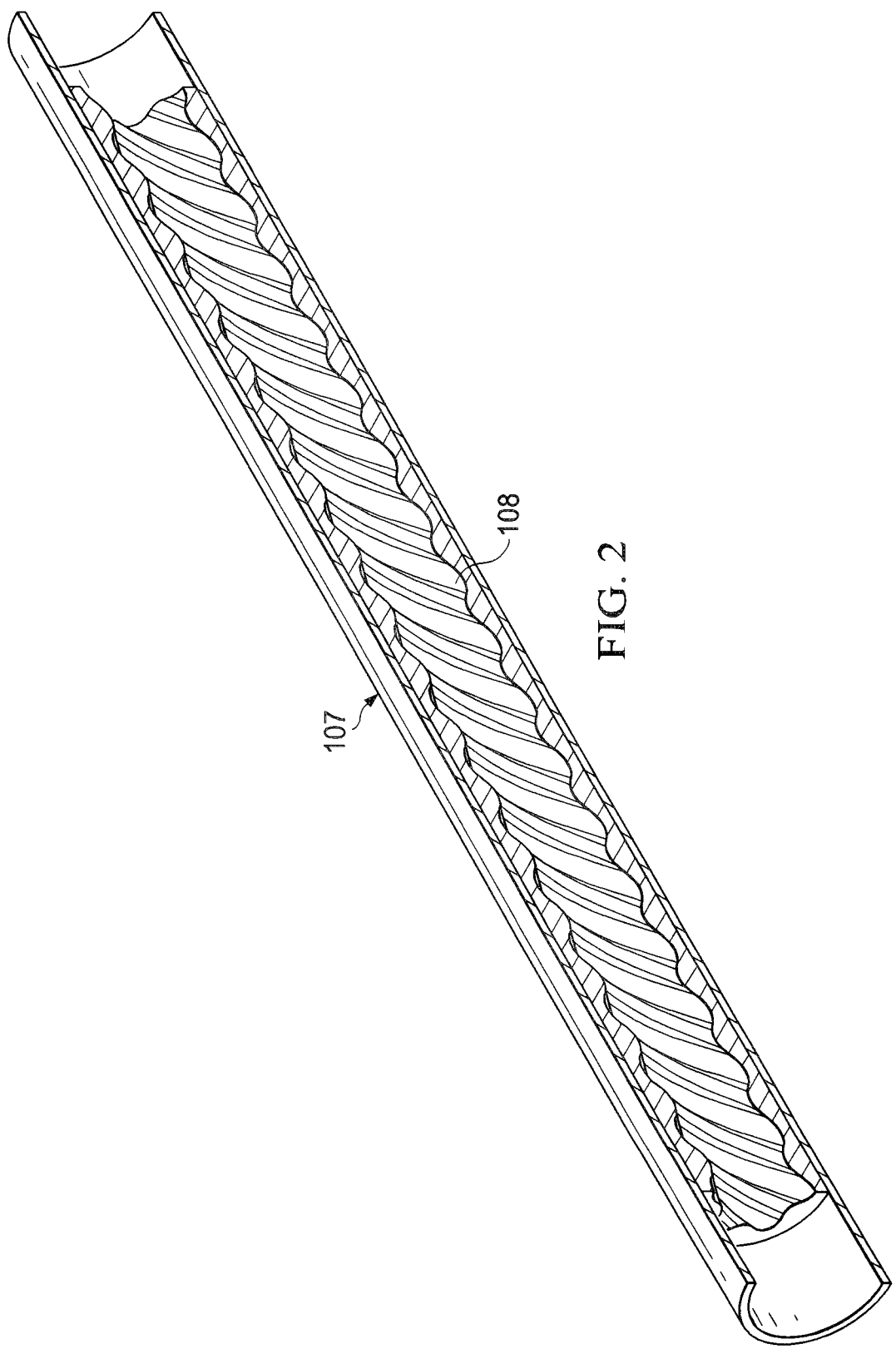
FIG. 2 is cutaway view showing a portion of the stator shown in FIGS. 1A and 1B, including a molded stator elastomeric liner.

FIGS. 1A, 1B and 2 schematically illustrate a representative, non-limiting example of an application of a downhole motor. A downhole motor assembly 100, which attaches to the end of a drilling string during oil and gas drilling operations. The downhole motor assembly 100 includes a top sub 101, stator and rotor assembly 102, transmission 103, an offset or adjustable housing 104, a bearing assembly 105 for a helical rotor 109, and a representative and non-limitations example of a downhole tool being rotated by the motor, which is in this example a drill bit 106. As can be best seen in FIG. 1B, a helical rotor 109 is offset within a helical stator liner 108 of a stator tube 107.

The stator compounds described herein may be used in the fabrication of azide cured elastomeric stator liners used in downhole motors, such as the one depicted in FIGS. 1A-1C, and downhole pumps. Generally, downhole motors and pumps are structurally similar; both implement power conversion. Downhole motors are typically used to provide torque and rotation to the drill bit or other downhole tool, and downhole pumps are typically used to move fluids under pressure and, in the case of positive displacement pumps, at a known flow rate. A typical stator for a downhole, positive displacement pump that functions according to the Moineau principle may have as few as two lobes. A typical stator for a downhole motor will have between three and ten lobes.

A stator liner for downhole applications should have good dynamic mechanical properties (low heat build-up), low swell in diesel-based muds and good hot mechanical properties at 200-350° F. Since progressive cavity pumps and progressive cavity motors are typically used in downhole oil and gas operations, they are subjected to particularly harsh and corrosive conditions. Such conditions include exposure to elevated temperatures present in downhole conditions or through continued downhole use; extended contact with hydrocarbon containing fluids; and extended contact with downhole corrosive fluids such as acidic and sulfuric conditions. In addition, stator longevity is particularly a concern in downhole environments. A damaged stator results in the inability to operate a progressive cavity pump or motor. While a damaged stator may be replaced, when used in a downhole environment, this results in extensive downtime and loss of productivity. To repair a damaged stator, current downhole operations must be stopped and the pump or motor, along with other downhole components of a drill string, must be raised to the surface for repair or replacement. Due to the particular nature of use of a progressive cavity pump or motor and the environmental conditions to which the stator of a progressive cavity pump or motor is subjected to, elastomers that are useful in other operations are not often applicable to use as a stator compound for a progressive cavity pump or motor.

It has been found that using a diazide as a curing agent for the stator compounds described below is capable of producing a stator with these desirable properties, and that such a stator liner will have one or more of these properties and is superior to stator liners molded from other stator compounds cured using a sulfur curing system or a peroxide curing system.

In one, representative embodiment a stator compound is formed by mixing: an elastomeric base that comprises 100 phr of one or more elastomeric polymers; from 0.1 to 120 phr of at least one reinforcing filler, such as carbon black, silica, or clay; and from 0.05 phr to 10 phr of at least one or more diazides. Elastomeric polymers that may be used in the elastomeric base include NBR, HNBR, NBIR, HNBIR, nitrile terpolymer, hydrogenated nitrile terpolymer, FKM, CR, EPDM, or ECO. In other representative embodiments, the elastomeric base comprises a single elastomeric component chosen from the group consisting of NBR, HNBR, NBIR, HNBIR, nitrile terpolymer, hydrogenated nitrile terpolymer, FKM, CR, EPDM, or ECO. The reinforcing filler comprises one or more reinforcing agents, or, alternatively, comprises one or more reinforcing agents, at least one of which is chosen from the group consisting essentially of carbon black, silica, clay, or consists of a carbon black, silica, or clay, or a combination of two or more of them.

In another example, the least one of the one or more diazides have the general formula of $N_3$-A-R—B-$N_3$. Preferably, each diazide in the mixture has this general formula. A and B are each a substituted or unsubstituted methylene group, a substituted or unsubstituted benzyl group, or a substituted or unsubstituted benzylidene group. R is a linear branched or cyclic alkylene group of 1 to 20 carbon atoms, which may also contain one or more heteroatoms such as S, N, or O. The diazide concentration in any one of the embodiments of the mixture forming the stator compound may range from 0.05 phr to about 10 phr. In other embodiments of the mixture the diazide concentration is in the range of about 0.2 phr to about 4.5 phr. 1,3-benzene disulfonyl azide (1,3 BDSA); 1,12-diazidododecane; 1,16-diazidohexadecane; 2,6-bis(4-azidobenzylidene)-4-methylcyclohexanone are specific examples of the at least one diazide crosslinking agents in the embodiments described. In other embodiments of the mixture, the at least one or more diazides are selected from a group consisting essentially of 1,3-benzene disulfonyl azide (1,3 BDSA); 1,12-diazidododecane; 1,16-diazidohexadecane; 2,6-bis(4-azidobenzylidene)-4-methylcyclohexanone.

The 1,3-bezene bis(sulfonyl azide) may be, but is not required to be, prepared by the following procedure. 9.25 g (1.45 moles) of sodium azide was dissolved in 1.0 liter of distilled water in an Erlenmeyer flask and transferred to a reaction chamber. 200.0 g (0.726 moles) of 1,3 benzene bis (sulfonyl chloride) was dissolved in >99% pure acetone in an Erlenmeyer flask. The resulting solution was transferred into a 500 ml dropping funnel, which was placed above the reaction chamber. The reaction chamber was chilled to 10° C. by pumping chilled water through the outer jacket of the reaction chamber. With stirring and continued chilling, the 1,3 benzene bis (sulfonyl chloride) solution was added to the reaction chamber by dripping from the dropping funnel at a maximum rate of 20 ml/min while maintaining the reaction temperature at 10° C. The resulting mixture was stirred at 10° C. for 18 hours. After this time, the reaction mixture displayed white crystals of 1,3, bezene bis(sulfonyl azide) and sodium chloride. With continued stirring, the reaction mixture was added to a container with 4 liters of distilled water, which resulted in the precipitation of 1,3, benzene bis(sulfonyl azide). The 1,3, benzene bis(sulfonyl azide) was collected by filtration and was washed with distilled water until a chloride test of the wash liquid with a 5% by weight silver nitride solution failed to indicate chloride in the wash liquid. The resulting product was dried in an over at 30-40° C. for 48 hours to yield approximately 400 grams of 1,3-bezene bis(sulfonyl azide). Typical conversion rates for this procedure are greater than 90%. The production of 1,3-bezene bis(sulfonyl azide) was confirmed by FTIR and melting point, compared to known samples.

In some embodiments, a plasticizer is added to the stator compound to improve physical or chemical properties of the stator compound. Plasticizers that may be used include poly-alpha olefins; adipates, such as dioctyl adipate and dibutoxyethoxyethel adipate; trimellitates, such as tris(2-ethylhexyl) trimellitate); triphenyl phosphate; and phthalates, such as diisodecyl phthalate.

Several samples of 1,3-bezene bis(sulfonyl azide) crosslinked elastomeric stator compounds were prepared. These compounds were formed by mixing a fully saturated HNBR, N774 carbon black, N134 carbon black, C-par paraffin or triphenyl phosphate, and 1,3 benzene bi disulfonyl azide. The HNBR concentration was constant in all variations at 100 phr. The N134 carbon black concentration was held constant in all variations at 15 phr. The variable concentration components used to form these diazide crosslinked elastomeric compounds are shown in Table 1 below.

TABLE 1

| Sample No. | N774 (phr) | Cpar-P50 (phr) | Azide (phr) |
|---|---|---|---|
| 1 | 90 | 10 | 2.5 |
| 2 | 90 | 30 | 2.5 |
| 3 | 60 | 30 | 2.5 |
| 4 | 60 | 30 | 3.2 |
| 5 | 90 | 10 | 3.2 |
| 6 | 60 | 10 | 2.5 |
| 7 | 60 | 10 | 3.2 |
| 8 | 8 | 90 | 30 |

The resulting elastomeric compounds were tested for modulus 25%, elongation, modulus 25% at 121° C., and fatigue. The results of these tests are shown in Table 2 below.

TABLE 2

| Sample No. | Modulus 25% (psi) | Elongation (%) | Modulus 25% at 121 C. (psi) | Fatigue (cycles) |
|---|---|---|---|---|
| 1 | 553 | 252 | 271 | 80000 |
| 2 | 335 | 362 | 169 | 100000 |
| 3 | 220 | 496 | 119 | 100000 |
| 4 | 226 | 434 | 150 | 10000 |
| 5 | 548 | 227 | 317 | 125 |
| 6 | 321 | 388 | 184 | 35000 |
| 7 | 351 | 307 | 230 | 1500 |
| 8 | 372 | 241 | 202 | 130 |

For comparison of an azide cured stator compound to a stator compound cured by other curing agents, three samples were prepared, each having the same components except for the curing agents. A masterbatch for each sample was prepared by combing in a Brabender mixer 125.00 grams of Zeon Zetpol 1020L; 25.00 grams of N550 carbon black; 25.00 grams of N774 carbon black; 35 grams of HiSil 532 EP; 1.62 grams of A172 DLC; 6.25 grams of Zinc Oxide 205 HAS; 1.87 grams of Vanox CDPA; 18.12 grams of Natrochem R153 DLC-68; 17.37 grams of Saret 517 DLC A75; and 6.25 grams of Sartomer SR350. The mixer was set at 60 rpm, and the polymer was added. After 1 minute 30 seconds, the other components were added in the order listed. The chiller was set for 85-90° C. The speed was reduced to keep the temperature below 125° C. After addition of all components, the mixture was mixed for an additional 1 minute 30 seconds. The speed of the mixer was reduced to 15 rpm and mixing continued until the temperature reached just under 125° C. At this point, the masterbatch was dumped.

After cooling a final pass mixture was formed by adding the masterbatch to a Brabender mixer. The mixing speed was set to 60 rpm, and the masterbatch was mixed for 1 minute. After which, the curing agent was added. For the diazide cured elastomer, 5.50 grams of 1,3-benzene disulfonyl azide was added. For the peroxide cured elastomer, 13.75 grams of Luperox DC40P-SP2 was added. The resulting mixture was mixed until the temperature reached 100° C. At which time, the mixture was dumped and milled.

Figure 3:
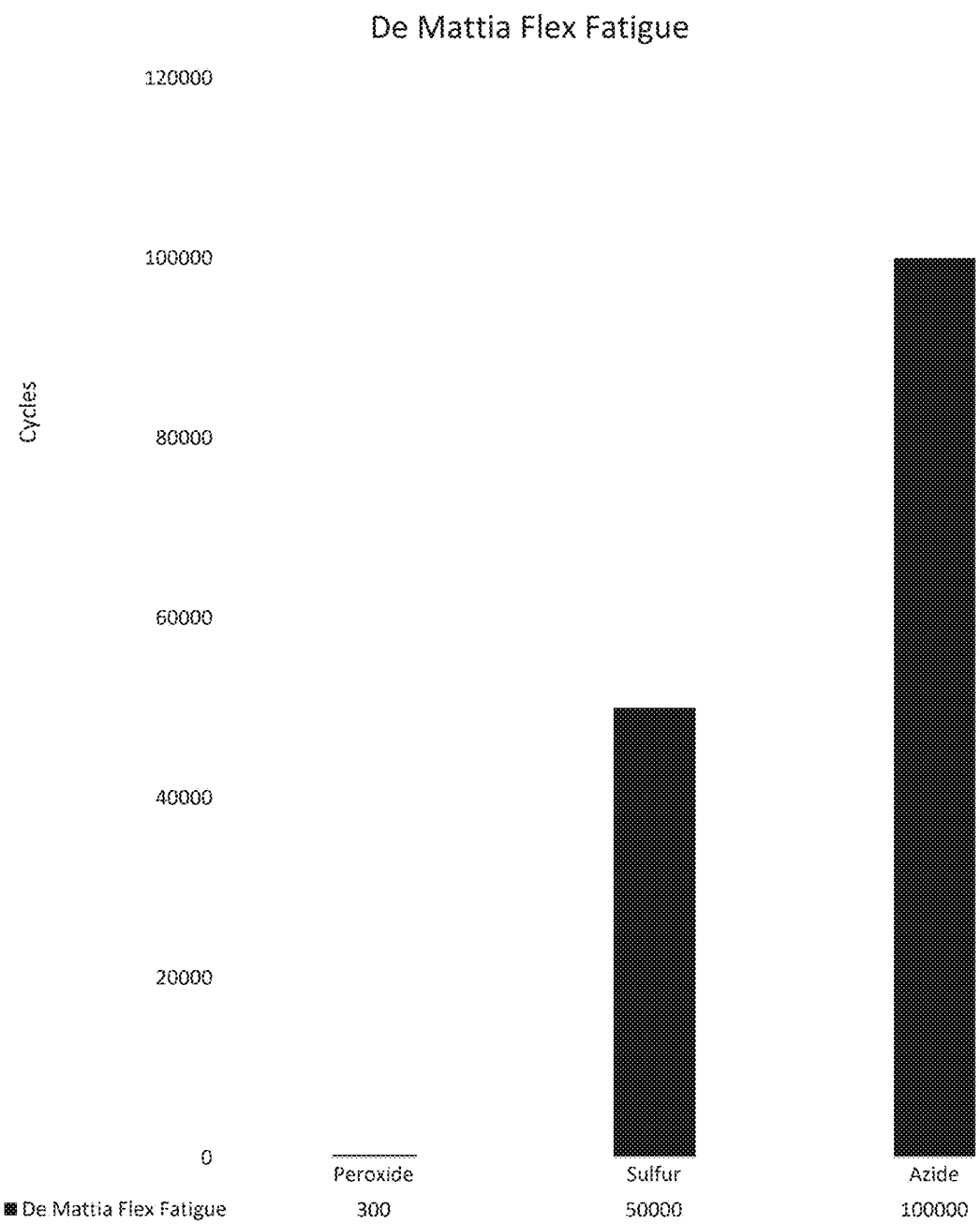
FIG. 3 is a graph comparing the de matia flex fatigue of an embodiment of an azide cured elastomer to sulfur and peroxide cured elastomers.

Once each was cured, each of the peroxide cured, sulfur cured, and diazide cured samples were tested to determine DeMatia flex fatigue. The results are depicted in FIG. 3. As can be seen from the data, the diazide cured elastomer shows significantly increased DeMatia flex fatigue.

A number of azide cured samples were prepared with the goal of producing a final diazide cured elastomer that exhibited the chemical and physical properties desired for use as a stator compound and as a stator. Examples 1 to 22 were prepared as described below.

Example 1

|  | Amount (Grams) |
|---|---|
| Masterbatch Components | |
| Zetpol 1020L | 126.59 |
| N550 carbon black | 25.32 |
| N774 carbon black | 75.95 |
| Zinc Oxide 205 HAS | 6.33 |
| Sidistar R320 | 12.66 |
| Masterbatch Dump Temperature: | 110° C. |
| Final Pass Components | |
| Masterbatch mixture | 2.37 |
| 1,3-Benzene Disulfonyl Azide | |
| Final Pass Dump Temperature: | 100° C. |

Example 1 was formed by the following procedure. A masterbatch was formed by mixing 126.59 grams of Zeon Zetpol 1020L; 25.32 grams of N550 Carbon Black; 75.95 grams of CN774 Carbon Black; 6.33 grams of Zinc Oxide 205 HAS; and 12.66 grams of Sidistar R320. All ingredients, except for the carbon blacks, were mixed in a Brabender mixer for 30 seconds. At which time, the carbon black components were added. The resulting mixture was dumped at 110° C. The final pass compound was formed by mixing the masterbatch and 2.37 grams of 1,3-bezene bis(sulfonyl azide). This mixture was mixed until dumped at 100° C. This resulted in an elastomeric compound with very high Mooney Viscosity, good scorch safety, a 25% modulus around 380 psi, and very good flex fatigue.

Example 2

|  | Amount (Grams) |
|---|---|
| Masterbatch Components | |
| Zetpol 1020L | 126.59 |
| N550 carbon black | 25.32 |
| N774 carbon black | 75.95 |
| Zinc Oxide 205 HAS | 6.33 |
| Sidistar R320 | 12.66 |
| Masterbatch Dump Temperature: | 130° C. |
| Final Pass Components | |
| Masterbatch mixture | 2.37 |
| 1,3-Benzene Disulfonyl Azide | |
| Final Pass Dump Temperature: | 100° C. |

Example 2 was formed by the following procedure. 126.59 grams of Zeon Zetpol 2000L were added to Brandender mixer. After 30 seconds, 25.32 grams of N550 carbon black; 75.95 grams of N774 carbon black; and 6.33 grams of Zinc Oxide 205 HAS was added to the masterbatch. This was mixed and dumped at a final temperature of 130° C. The final pass was formed by mixing the masterbatch with 2.37 grams of 1,3-bezene bis(sulfonyl azide). This was mixed and then dumped at 100° C. The final elastomer produced in this example showed similar physical properties as the first example. However, the elastomer showed better scorch safety, higher crosslink and, much higher tear resistance than the first example. This elastomer also showed very good flex fatigue compared to elastomer produced by curing the same masterbatch with sulfur.

Example 3

|  | Amount (Grams) |
|---|---|
| Masterbatch Components | |
| Zetpol 1020L | 126.99 |
| N550 carbon black | 11.70 |
| N774 carbon black | 70.20 |
| Zinc Oxide 205 HAS | 5.85 |
| Sidistar R320 | 11.70 |
| Masterbatch Dump Temperature: | 130° C. |
| Final Pass Components | |
| Masterbatch mixture | 6.58 |
| 1,3-Benzene Disulfonyl Azide | |
| Final Pass Dump Temperature: | 100° C. |

Example 3 was formed by the following procedure. A masterbatch was formed by adding 116.99 grams of Zeon Zetpol 2000L to a Brandender mixer. After 30 seconds, 11.70 grams of Nipol 1312V DLC; 23.40 grams of N550 carbon black; and 70.20 grams of N774 carbon black were added. After mixing for an additional 2.5 minutes, 5.85 grams of Zinc Oxide and 11.70 grams of Sidistar were added. The mixture was mixed until it was dumped at a temperature of 130° C. A final pass was formed by mixing the masterbatch with 6.58 grams 1,3-bezene bis(sulfonyl azide). The final pass was mixed until it was dumped at 100°

C. The resulting elastomeric material showed a reduced Mooney viscosity than in the second example above, good scorch safety, acceptable modulus, and an acceptable tear resistance. But, the resulting compound showed increased flex fatigue. This was likely due to the increased concentration of diazide used in the final pass.

Examples 4-21

Example 4

| | Amount (grams) |
|---|---|
| Masterbatch Components | |
| Therban AT 4364 VP | 108.69 |
| Nipol 1312LV DLC | 21.74 |
| N550 carbon black | 21.74 |
| N774 carbon black | 65.22 |
| Zinc Oxide 205 HAS | 5.43 |
| Sidistar R320 | 10.87 |
| Vanox MBM PWD | 5.43 |
| Masterbatch Dump Temperature: | 130° C. |
| Final Pass Components: | |
| Masterbatch mixture | 4.08 |
| 1,3-Benzene Disulfonyl Azide | |
| Final Pass Dump Temperature: | 100° C. |

Example 5

| | Amount (grams) |
|---|---|
| Masterbatch Components | |
| Therban AT 3404 | 128.95 |
| N774 carbon black | 77.37 |
| Zinc Oxide 205 HSA | 6.45 |
| Sidistar R320 | 12.89 |
| Masterbatch Dump Temperature: | 130° C. |
| Final Pass Components: | |
| Masterbatch mixture | 7.25 |
| 1,3-Benzene Disulfonyl Azide | |
| Final Pass Dump Temperature: | 100° C. |

Example 6

| | Amount (grams) |
|---|---|
| Masterbatch Components | |
| Zeon Zetpol 2000L | 97.16 |
| Nipol 1312LV DLC | 9.72 |
| N550 carbon black | 19.43 |
| N774 carbon black | 77.73 |
| Zinc Oxide 205 HSA | 4.86 |
| Sidistar R320 | 9.72 |
| Masterbatch Dump Temperature: | 130° C. |
| Final Pass Components: | |
| Masterbatch mixture | 3.64 |
| 1,3-Benzene Disulfonyl Azide | |
| Final Pass Dump Temperature: | 100° C. |

Example 7

| | Amount (grams) |
|---|---|
| Masterbatch Components | |
| Zeon Zetpol 2000L | 109.96 |
| N550 carbon black | 21.99 |
| N774 carbon black | 65.98 |
| Zinc Oxide 205 HSA | 5.50 |
| Sidistar R320 | 11.00 |
| Masterbatch Dump Temperature: | 130° C. |
| Final Pass Components: | |
| Masterbatch mixture | 4.07 |
| 1,3-Benzene Disulfonyl Azide | |
| Final Pass Dump Temperature: | 100° C. |

Example 8

| | Amount (grams) |
|---|---|
| Masterbatch Components | |
| Zeon Zetpol 2000L | 105.75 |
| N550 carbon black | 21.15 |
| N774 carbon black | 63.45 |
| Zinc Oxide 205 HSA | 5.29 |
| Sidistar R320 | 10.58 |
| Masterbatch Dump Temperature: | 130° C. |
| Final Pass Components: | |
| Masterbatch mixture | 11.74 |
| 2,6-Bis(4-azidobenzykidene)cyclohexane | |
| Final Pass Dump Temperature: | 100° C. |

Example 9

| | Amount (grams) |
|---|---|
| Masterbatch Components | |
| Zeon Zetpol 2000L | 111.31 |
| N550 carbon black | 22.26 |
| N774 carbon black | 66.79 |
| Sidistar R320 | 11.13 |
| Masterbatch Dump Temperature: | 130° C. |
| Final Pass Components: | |
| Masterbatch mixture | 2.09 |
| 1,3-Benzene Disulfonyl Azide | |
| Final Pass Dump Temperature: | 130° C. |

Example 10

| | Amount (grams) |
|---|---|
| Masterbatch Components | |
| Zeon Zetpol 2001EP | 130.17 |
| N550 carbon black | 13.02 |
| N774 carbon black | 39.05 |
| Sidistar R320 | 13.02 |
| Masterbatch Dump Temperature: | 130° C. |

Example 11

| | Amount (grams) |
|---|---|
| Masterbatch Components | |
| Zeon Zetpol 2001EP | 121.78 |
| N550 carbon black | 12.18 |
| N774 carbon black | 36.53 |
| Sidistar R320 | 12.18 |
| Masterbatch Dump Temperature: | 130° C. |
| Final Pass Components: | |
| Masterbatch mixture | 4.57 |
| 1,3-Benzene Disulfonyl Azide | |
| Akrochem P55 Resin | 12.18 |
| Final Pass Dump Temperature: | 100° C. |

Example 12

| | Amount (grams) |
|---|---|
| Masterbatch Components | |
| Zeon Zetpol 2001EP | 127.01 |
| N550 carbon black | 12.70 |
| N774 carbon black | 38.10 |
| Sidistar R320 | 12.70 |
| Masterbatch Dump Temperature: | 105° C. |
| Final Pass Components: | |
| Masterbatch mixture | 2.38 |
| 1,3-Benzene Disulfonyl Azide | |
| Trigonox 311 | 6.35 |
| Final Pass Dump Temperature: | 100° C. |

Example 13

| | Amount (grams) |
|---|---|
| Masterbatch Components | |
| Zeon Zetpol 2000L | 111.31 |
| N134 carbon black | 22.26 |
| N774 carbon black | 66.79 |
| Sidistar R320 | 11.13 |
| Masterbatch Dump Temperature: | 110° C. |
| Final Pass Components: | |
| Masterbatch mixture | 2.09 |
| 1,3-Benzene Disulfonyl Azide | |
| Final Pass Dump Temperature: | 100° C. |

Example 14

| | Amount grams) |
|---|---|
| Masterbatch Components | |
| Zeon Zetpol 2000L | 107.19 |
| N134 carbon black | 21.44 |
| N774 carbon black | 64.31 |
| Sidistar R320 | 10.72 |
| Cpar P-52 | 10.72 |
| Masterbatch Dump Temperature: | 110° C. |
| Final Pass Components: | |
| Masterbatch mixture | 2.01 |
| 1,3-Benzene Disulfonyl Azide | |
| Final Pass Dump Temperature: | 100° C. |

Example 15

| | Amount grams) |
|---|---|
| Masterbatch Components | |
| Zeon Zetpol 2001EP | 49.03 |
| Zeon Zetpol 2000L | 49.03 |
| N134 carbon black | 19.61 |
| N774 carbon black | 68.64 |
| Sidistar R320 | 9.81 |
| Cpar P-52 | 19.61 |
| Masterbatch Dump Temperature: | 110° C. |
| Final Pass Components: | |
| Masterbatch mixture | 3.68 |
| 1,3-Benzene Disulfonyl Azide | |
| Final Pass Dump Temperature: | 100° C. |

Example 16

| | Amount (grams) |
|---|---|
| Masterbatch Components | |
| Zeon Zetpol 2001EP | 99.54 |
| Vestenamer 8012 | 9.95 |
| N134 carbon black | 19.91 |
| N774 carbon black | 59.72 |
| Sidistar R320 | 9.95 |
| Cpar P-52 | 9.95 |
| Masterbatch Dump Temperature: | 110° C. |
| Final Pass Components: | |
| Masterbatch mixture | 2.49 |
| 1,3-Benzene Disulfonyl Azide | |
| Final Pass Dump Temperature: | 105° C. |

Example 17

| | Amount (grams) |
|---|---|
| Masterbatch Components | |
| Zeon Zetpol 2001EP | 100.98 |
| N134 carbon black | 20.20 |
| N774 carbon black | 60.59 |

-continued

| | Amount (grams) |
|---|---|
| Final Pass Components: | |
| Masterbatch mixture | 4.88 |
| 1,3-Benzene Disulfonyl Azide | |
| Final Pass Dump Temperature: | 100° C. |

-continued

|  | Amount (grams) |
|---|---|
| Sidistar R320 | 10.10 |
| Sunpar 2280 | 15.15 |
| Masterbatch Dump Temperature: | 110° C. |
| Final Pass Components: | |
| Masterbatch mixture | 2.02 |
| 1,3-Benzene Disulfonyl Azide | |
| Final Pass Dump Temperature: | 100° C. |

Example 18

|  | Amount (grams) |
|---|---|
| Masterbatch Components | |
| Zeon Zetpol 2001EP | 94.66 |
| N134 carbon black | 14.20 |
| N774 carbon black | 83.30 |
| Cpar P-52 | 13.25 |
| Masterbatch Dump Temperature: | 110° C. |
| Final Pass Components: | |
| Masterbatch mixture | 2.75 |
| 1,3-Benzene Disulfonyl Azide | |
| Final Pass Dump Temperature: | 105° C. |

Example 19

|  | Amount grams) |
|---|---|
| Masterbatch Components | |
| Zeon Zetpol 2001EP | 92.10 |
| NCTD 1803 | 11.37 |
| N774 carbon black | 70.32 |
| Cpar P-52 | 20.09 |
| Masterbatch Dump Temperature: | 110° C. |
| Final Pass Components: | |
| Masterbatch mixture | 2.91 |
| 1,3-Benzene Disulfonyl Azide | |
| Final Pass Dump Temperature: | 100° C. |

Example 20

|  | Amount (grams) |
|---|---|
| Masterbatch Components | |
| Zeon Zetpol 1020L | 204.85 |
| N134 carbon black | 30.73 |
| N774 carbon black | 122.91 |
| Cpar P-52 | 61.46 |
| Zinc Stearate 66451 | 4.10 |
| Masterbatch Dump Temperature: | 110° C. |
| Final Pass Components: | |
| Masterbatch mixture | 5.12 |
| 1,3-Benzene Disulfonyl Azide | |
| Rhenocure S-80/PB | 2.56 |
| Cure-Rite OBTS | 2.05 |
| Final Pass Dump Temperature: | 105° C. |

Example 21

| Components | Amount grams) |
|---|---|
| Zeon Zetpol 2001EP | 281.84 |
| N134 carbon black | 42.28 |
| N774 carbon black | 112.73 |
| 1,3-Benzene Disulfonyl Azide | 7.05 |
| Dump Temperature: | 105° C. |

Examples 4-20 were formed using similar procedures as those described for Examples 1-3 above. Example 21 was also formed by a similar procedure, except instead of creating a masterbatch that was subsequently cured in a final pass, all components of the elastomer, including 1,3-benzene disulfonyl, were added in one batch and mixed until dumped.

Zetpol 1020 being a highly saturated copolymer of butadiene and acrylonitrile commercially available from Zeon Chemicals, L.P., Zetpol 2001EP being a hydrogenated rubber commercially available from Zeon Chemicals, L.P., Zeon Zetpol 2000L being low Mooney viscosity version of a highly saturated copolymer of butadiene and acrylonitrile. Therban AT 3404 being a low viscosity hydrogenated butadiene acrylonitrile copolymer with less than 1% residual double bonds that is commercially available from Arlanxeo. Nipol 1312LV DLC being a copolymer of butadiene and acrylonitrile commercially available from Zeon Chemicals, L.P., N134 carbon black being a high reinforcing carbon black available from a number of commercial sources. N774 carbon black being a semi reinforcing carbon black available from a number of commercial sources. Rhenocure S-80/PB being a sulfur-based curing agent commercially available from RheinChemie Additives. Cure-Rite OBTS being sulfonamide curing accelerator being commercially available from Emerald Kalama Chemical. Cpar P-52 being a medium chain chlorinated paraffin plasticizer commercially available from Qualice Service, LLC. NCTD 1803 being a blend of 100 phr Zetpol 2001EP, 40 phr of Nanocyl NC7000 nanotubes, 10 phr of Ricon 153 polybutadiene and 1.2 Benzoyl peroxide. Sidistar R320 being an amorphous non reinforcing silicon dioxide with an average particle size of 150 nm commercially available from Elkem. Sunpar 2280 being a paraffinic oil available from HollyFrontier Refining and Marketing. Trigonox 311 being a peroxide curing agent for the cross linking of natural and synthetic rubbers commercially available from Nouryon. Vestenamer 8012 being an additive commercially available from Evonik. Akrochem P55 Resin being a phenolic resin commercially available from Akrochem Corporation. Vanox MBM PWD being coagent additive commercially available from Vanderbuilt Chemicals, LLC.

The examples were tested for physical and chemical properties including: mooney viscosity; MDR for 60 minutes at 160° C.; tensile strength, elongation, 25% modulus, 50% modulus, 100% modulus, tear die-c, and trouser tear at 25° C. and 121° C.; and demattia flex. Some example elastomers were also tested for resistance to solvents by submerging samples in diesel, water, or IRM903 for 70 hours at 149° C. and then determining tensile strength, elongation, 25% modulus, 50% modulus, 100% modulus, tear die-c, and trouser tear for each sample. The results for Example 2 are provided below in Table 3.

TABLE 3

| | UNITS | | |
|---|---|---|---|
| Mooney Viscosity | | | |
| ML(1 + 4) @ 100° C. | MU | 170.36 | |
| T5 @ 100° C. | min | 110.33 | |
| MDR 60'@160° C. | | | |
| ML | dNm | 3.49 | |
| MH | dNm | 21.14 | |
| ts2 | min | 1.07 | |
| tc90 | min | 18.81 | |
| tan Delta | | 0.22 | |
| Properties @25 C. | | | |
| Durometer | Shore A | 75 | |
| Tensile Strength | psi | 1730 | |
| Elongation | % | 441 | |
| 25% Modulus | psi | 333 | |
| 50% Modulus | psi | 468 | |
| 100% Modulus | psi | 769 | |
| Tear Die-C | ppi | 352 | |
| Trouser Tear | ppi | 209.2 | |
| Properties @121 C. | | | |
| Tensile Strength | psi | 867 | |
| Elongation | % | 311 | |
| 25% Modulus | psi | 148 | |
| 50% Modulus | psi | 207 | |
| 100% Modulus | psi | 312 | |
| Tear Die-C | ppi | 177 | |
| Trouser Tear | ppi | 84.8 | |
| DeMattia Flex | | | |
| Cycles to Final Width | | 100,000 | |
| Diesel 70 h@149 C. | | | |
| Duro Change | Δ Pts | | −19.1 |
| Tensile Strength | psi | %Δ | 1847 | 455.3 |
| Elongation | % | %Δ | 457 | −2.3 |
| 25% Modulus | psi | %Δ | 154 | −80.0 |
| 50% Modulus | psi | %Δ | 225 | −36.1 |
| 100% Modulus | psi | %Δ | 400 | 91.2 |
| Volume Change | % | | 13.8 |
| Water 70 h@149 C. | | | |
| Duro Change | Δ Pts | | −7 |
| Tensile Strength | psi | %Δ | 2060 | 519.3 |
| Elongation | % | %Δ | 498 | 6.5 |
| 25% Modulus | psi | %Δ | 278 | −63.9 |
| 50% Modulus | psi | %Δ | 384 | 9.1 |
| 100% Modulus | psi | %Δ | 611 | 192.1 |
| Volume Change | % | | 16.8 |
| IRM903 70 h@149 C. | | | |
| Duro Change | Δ Pts | | −12.5 |
| Tensile Strength | psi | %Δ | 2046 | 515.1 |
| Elongation | % | %Δ | 512 | 9.5 |
| 25% Modulus | psi | %Δ | 218 | −71.7 |
| 50% Modulus | psi | %Δ | 310 | −11.9 |
| 100% Modulus | psi | %Δ | 543 | 159.6 |
| Volume Change | % | | 13.9 |

Additional examples of azide cured stator compounds were prepared in which triphenyl phosphate was used as a plasticizer in place of chlorinated paraffin component of the previous examples. These are examples 22-32, which were prepared with the components indicated in below.

Example 22

| Masterbatch Components | Amount (grams) |
|---|---|
| Zeon Zetpol 2001EP | 245.67 |
| N134 carbon black | 36.85 |
| N774 carbon black | 147.40 |
| Triphenyl Phosphate | 24.57 |
| 1,3-Benzene Disulfonyl Azide | 2.49 |

Example 22 was prepared by adding to the Zeon Zetpol 2001EP to a Brabender mixer, allowing the mixture to run for 30 seconds, adding triphenyl phosphate, N134 carbon black, and N774 carbon black, mixing for 60 seconds, and then adding 1,3-benzene disulfonyl azide. The resulting mixture was further mixed until the temperature reached 105° C., at which point the resulting elastomer was dumped.

Example 23

| | Amount (grams) |
|---|---|
| Masterbatch Components | |
| Zeon Zetpol 2001EP | 231.85 |
| N134 carbon black | 34.78 |
| N774 carbon black | 162.30 |
| Triphenyl Phosphate | 23.19 |
| Technoflon FPA1 | 11.59 |
| Masterbatch Dump Temperature: | 130° C. |
| Final Pass Components: | |
| Masterbatch mixture | 5.80 |
| 1,3-Benzene Disulfonyl Azide | |
| Final Pass Dump Temperature: | 105° C. |

Example 23 was prepared by loading the Zeon Zetpol 2001EP into a mixer, mixing for 30 seconds, adding N134 carbon black, N774 carbon black, triphenyl phosphate, and technoflon FPA1. The resulting mixture was mixed until the temperature reached 130° C., at which point the masterbatch was dumped and allowed to cool. The master batch was then added to a mixer along with 1,3-benzene disulfonyl azide. The resulting mixture was mixed until the temperature reached 105° C., at which point it was dumped.

Examples 24-32

Example 24

| | Amount (grams) |
|---|---|
| Masterbatch Components | |
| Zeon Zetpol 2001EP | 207.23 |
| N134 carbon black | 31.08 |
| N774 carbon black | 145.06 |
| Triphenyl Phosphate | 41.45 |
| Technoflon FPA1 | 41.45 |
| Masterbatch Dump Temperature: | 130° C. |
| Final Pass Components: | |
| Masterbatch mixture | 5.18 |
| 1,3-Benzene Disulfonyl Azide | |
| Final Pass Dump Temperature: | 105° C. |

Example 25

|  | Amount (grams) |
|---|---|
| Masterbatch Components | |
| Zeon Zetpol 2001EP | 227.95 |
| N134 carbon black | 34.19 |
| N774 carbon black | 159.57 |
| Triphenyl Phosphate | 22.80 |
| Technoflon FPA1 | 22.80 |
| Masterbatch Dump Temperature: | 130° C. |
| Final Pass Components: | |
| Masterbatch mixture | 5.70 |
| 1,3-Benzene Disulfonyl Azide | |
| Final Pass Dump Temperature: | 105° C. |

Example 26

|  | Amount (grams) |
|---|---|
| Masterbatch Components | |
| Zeon Zetpol 2001EP | 216.55 |
| N134 carbon black | 32.48 |
| N774 carbon black | 151.58 |
| Triphenyl Phosphate | 32.48 |
| Technoflon FPA1 | 32.48 |
| Masterbatch Dump Temperature: | 130° C. |
| Final Pass Components: | |
| Masterbatch mixture | 5.41 |
| 1,3-Benzene Disulfonyl Azide | |
| Final Pass Dump Temperature: | 105° C. |

Example 27

|  | Amount (grams) |
|---|---|
| Masterbatch Components | |
| Zeon Zetpol 2001EP | 215.63 |
| N134 carbon black | 32.34 |
| N774 carbon black | 150.94 |
| Triphenyl Phosphate | 43.13 |
| Technoflon FPA1 | 21.56 |
| Masterbatch Dump Temperature: | 130° C. |
| Final Pass Components: | |
| Masterbatch mixture | 5.39 |
| 1,3-Benzene Disulfonyl Azide | |
| Final Pass Dump Temperature: | 105° C. |

Example 28

|  | Amount (grams) |
|---|---|
| Masterbatch Components | |
| Zeon Zetpol 2001EP | 195.15 |
| N134 carbon black | 29.27 |
| N774 carbon black | 175.64 |
| Triphenyl Phosphate | 39.03 |
| Technoflon FPA1 | 39.03 |
| Masterbatch Dump Temperature: | 130° C. |
| Final Pass Components: | |
| Masterbatch mixture | 4.88 |
| 1,3-Benzene Disulfonyl Azide | |
| Final Pass Dump Temperature: | 105° C. |

Example 29

|  | Amount (grams) |
|---|---|
| Masterbatch Components | |
| Zeon Zetpol 2001EP | 212.30 |
| N134 carbon black | 31.85 |
| N774 carbon black | 191.07 |
| Triphenyl Phosphate | 21.23 |
| Technoflon FPA1 | 21.23 |
| Masterbatch Dump Temperature: | 130° C. |
| Final Pass Components: | |
| Masterbatch mixture | 5.31 |
| 1,3-Benzene Disulfonyl Azide | |
| Final Pass Dump Temperature: | 105° C. |

Example 30

|  | Amount (grams) |
|---|---|
| Masterbatch Components | |
| Zeon Zetpol 2001EP | 204.22 |
| N134 carbon black | 30.63 |
| N774 carbon black | 183.80 |
| Triphenyl Phosphate | 20.42 |
| Technoflon FPA1 | 40.84 |
| Masterbatch Dump Temperature: | 130° C. |
| Final Pass Components: | |
| Masterbatch mixture | 5.11 |
| 1,3-Benzene Disulfonyl Azide | |
| Final Pass Dump Temperature: | 105° C. |

Example 31

|  | Amount (grams) |
|---|---|
| Masterbatch Components | |
| Zeon Zetpol 2001EP | 217.47 |
| N134 carbon black | 32.62 |
| N774 carbon black | 152.23 |
| Triphenyl Phosphate | 21.75 |
| Technoflon FPA1 | 43.49 |
| Masterbatch Dump Temperature: | 130° C. |
| Final Pass Components: | |
| Masterbatch mixture | 5.44 |
| 1,3-Benzene Disulfonyl Azide | |
| Final Pass Dump Temperature: | 105° C. |

Example 32

| | Amount (grams) |
|---|---|
| Masterbatch Components | |
| Zeon Zetpol 2001EP | 203.37 |
| N134 carbon black | 30.51 |
| N774 carbon black | 183.03 |
| Triphenyl Phosphate | 40.67 |
| Technoflon FPA1 | 20.34 |
| Masterbatch Dump Temperature: | 130° C. |
| Final Pass Components: | |
| Masterbatch mixture | 5.08 |
| 1,3-Benzene Disulfonyl Azide | |
| Final Pass Dump Temperature: | 105° C. |

Examples 24-32 were prepared by the same method as described in the preparation of example 23. A sample of azide cured elastomer was prepared according to example 22 described above. The sample was tested to determine various physical properties of the sample, which are summarized in Table 4 below.

TABLE 4

| | Test | Units | |
|---|---|---|---|
| M V | ML(1 + 4) @ 100° C. | MU | 54.56 |
| | T5 @ 100° C. | min | 88.39 |
| MDR 60' @160° C. | ML | dNm | 0.96 |
| | MH | dNm | 21.17 |
| | ts2 | min | 2.19 |
| | tc90 | min | 26.32 |
| | tan Delta | | 0.15 |
| | Slab Cure | min@° C. | 60'@160° C. |
| Properties @ 25° C. | Durometer | Shore A psi | 76 |
| | Tensile Strength | psi | 3058 |
| | Elongation | % | 363 |
| | 25% Modulus | psi | 361 |
| | 50% Modulus | psi | 564 |
| | 100% Modulus | psi | 1054 |
| | Tear Die-C | ppi | 283 |
| | Trouser Tear | ppi | 70.9 |
| Hot Properties @121° C. | Tensile Strength | psi | 1430 |
| | Elongation | % | 230 |

TABLE 4-continued

| | Test | Units | |
|---|---|---|---|
| | 25% Modulus | psi | 197 |
| | 50% Modulus | psi | 308 |
| | 100% Modulus | psi | 568 |
| | Tear Die-C | ppi | 97 |
| | Trouser Tear | ppi | 26.9 |
| | Specimen Cure | min@° C. | 65'@160° C. |
| DeMattia Flex | Cycles to 10 mm width | | |
| | Cycles to 16 mm width | | |
| | Final Crack Width | mm | 20.5 |
| | Cycles to Final Width | | 100,000 |

A sample of azide cured elastomer was prepared according to example 22 described above. The sample was immersed in either diesel, water, or IRM903 at 149° C. for 70 hours. The immersed samples were then tested to determine various physical properties of the sample, which are summarized in Table 5 below.

TABLE 5

| | | | | | |
|---|---|---|---|---|---|
| Physical Test | Duro Change | | Δ PTS | | −8.1 |
| Results After | Tensile Strength | psi | %Δ | 2900 | −5.2 |
| Immersion in | Elongation | % | %Δ | 376 | 3.7 |
| Diesel at 149° C. | 25% Modulus | psi | %Δ | 271 | −24.9 |
| for 70 Hours | 75% Modulus | psi | %Δ | 420 | −25.5 |
| | 100% Modulus | psi | %Δ | 794 | −24.7 |
| | Volume | | % | | 10.3 |
| Physical Test | Duro Change | | Δ PTS | | −7.3 |
| Results After | Tensile Strength | psi | %Δ | 3104 | 1.5 |
| Immersion in | Elongation | % | %Δ | 400 | 10.3 |
| Water at 149° C. | 25% Modulus | psi | %Δ | 281 | −22.1 |
| for 70 Hours | 75% Modulus | psi | %Δ | 443 | −21.4 |
| | 100% Modulus | psi | %Δ | 836 | −20.7 |
| | Volume | | % | | 17.2 |
| Physical Test | Duro Change | | Δ PTS | | −4.3 |
| Results After | Tensile Strength | psi | %Δ | 2875 | −6.0 |
| Immersion in | Elongation | % | %Δ | 392 | 8.1 |
| IRM 903 at | 25% Modulus | psi | %Δ | 326 | −9.6 |
| 149° C. | 75% Modulus | psi | %Δ | 495 | −12.2 |
| for 70 Hours | 100% Modulus | psi | %Δ | 902 | −14.4 |
| | Volume | | % | | 7.6 |

Samples of azide cured elastomers were prepared according to examples 24-32 described above. The samples were tested to determine various physical properties of the samples, which are summarized in Table 6 below.

TABLE 6

| | TEST | UNITS | Example 24 | Example 25 | Example 26 | Example 27 | Example 28 | Example 29 | Example 30 | Example 31 | Example 32 |
|---|---|---|---|---|---|---|---|---|---|---|---|
| M V | ML(1 + 4) @ 100° C. | MU | 30.52 | 51.59 | 37.66 | 37.02 | 41.77 | 72.65 | 62.76 | 44.76 | 53.44 |
| | T5 @ 100° C. | min | >120 | >120 | >120 | >120 | >120 | 84.28 | 114.81 | >120 | 115.45 |
| MDR 60'@160° C. | ML | dNm | 0.68 | 1.08 | 0.84 | 0.83 | 1.08 | 1.71 | 1.71 | 1.06 | 1.35 |
| | MH | dNm | 14.12 | 21.76 | 17.95 | 16.92 | 18.52 | 24.41 | 22.69 | 18.75 | 19.51 |
| | ts2 | min | 2.98 | 2.09 | 2.48 | 2.57 | 2.21 | 1.36 | 1.67 | 2.26 | 1.69 |
| | tc90 | min | 26.03 | 27.87 | 28.82 | 28.62 | 28.53 | 22.09 | 23.06 | 25.12 | 23.98 |
| | tan Delta | | 0.19 | 0.15 | 0.17 | 0.17 | 0.18 | 0.17 | 0.17 | 0.16 | 0.17 |
| | Slab Cure | min@° C. | 60'@160° C. | 60'@160° C. | 60'@160° C. | 60'@160° C. | 60'@160° C. | 60'@160° C. | 60'@160° C. | 60'@160° C. | 60'@160° C. |
| Properties @ 25° C. | Durometer | Shore A | 73 | 78 | 77 | 71 | 80 | 86 | 87 | 79 | 83 |
| | Tensile Strength | psi | 2546 | 2843 | 2648 | 2593 | 2410 | 2699 | 2525 | 2653 | 2601 |
| | Elongation | % | 371 | 279 | 311 | 330 | 262 | 200 | 200 | 260 | 240 |
| | 25% Modulus | psi | 306 | 364 | 334 | 327 | 407 | 586 | 573 | 427 | 488 |
| | 50% Modulus | psi | 441 | 581 | 510 | 488 | 636 | 963 | 934 | 664 | 769 |
| | 100% Modulus | | | | | | | | | | |

TABLE 6-continued

|  | TEST | UNITS | Example 24 | Example 25 | Example 26 | Example 27 | Example 28 | Example 29 | Example 30 | Example 31 | Example 32 |
|---|---|---|---|---|---|---|---|---|---|---|---|
|  | Modulus | psi | 806 | 1130 | 958 | 917 | 1164 | 1714 | 1650 | 1231 | 1400 |
|  | Tear Die-C | ppi | 205 | 220 | 208 | 213 | 187 | 202 | 189 | 195 | 192 |
|  | Trouser Tear | ppi | 50.1 | 46.4 | 40.4 | 51.7 | 39.0 | 37.1 | 31.3 | 37.9 | 36.0 |
| Hot Properties @121° C. | Tensile Strength | psi | 967 | 1218 | 1000 | 1037 | 1008 | 1183 | 1105 | 1135 | 995 |
|  | Elongation 25% | % | 203 | 167 | 167 | 181 | 156 | 133 | 128 | 163 | 137 |
|  | Modulus 50% | psi | 144 | 203 | 173 | 172 | 201 | 264 | 265 | 206 | 226 |
|  | Modulus 100% | psi | 219 | 330 | 278 | 272 | 325 | 439 | 439 | 333 | 375 |
|  | Modulus | psi | 420 | 663 | 552 | 525 | 628 | 885 | 872 | 661 | 730 |
|  | Tear Die-C | ppi | 57 | 64 | 60 | 64 | 64 | 76 | 67 | 60 | 69 |
|  | Trouser Tear | ppi | 9.3 | 7.3 | 12.0 | 11.3 | 9.3 | 13.8 | 10.4 | 9.8 | 7.6 |
|  | Specimen Cure | min@° C. | 65'@ 160° C. | 65'@ 160° C. | 65'@ 160° C. | 65'@ 160° C. | 65'@ 160° C. | 65'@ 160° C. | 65'@ 160° C. | 65'@ 160° C. | 65'@ 160° C. |
| DeMattia Flex | Cycles to 10 mm width |  |  |  |  |  |  |  |  |  |  |
|  | Cycles to 16 mm width |  |  |  |  |  |  |  |  |  |  |
|  | Final Crack Width | mm | 25.4 | 25.4 | 25.4 | 25.4 | 25.4 | 25.4 | 25.4 | 25.4 |  |
|  | Cycles to Final Width |  | 3,000 | 215 | 725 | 2,500 | 260 | 80 | 100 | 440 |  |

Example 33

|  | Amount (grams) |
|---|---|
| Masterbatch Components |  |
| Zeon Zetpol 2001EP | 210.57 |
| N134 carbon black | 63.17 |
| N774 carbon black | 189.51 |
| Triphenyl Phosphate | 21.06 |
| Masterbatch Dump Temperature: | 130° C. |
| Final Pass Components: |  |
| Masterbatch mixture | 4.21 |
| 1,3-Benzene Disulfonyl Azide |  |
| Final Pass Dump Temperature: | 105° C. |

Example 33 was prepared with the components listed above. Example 33 was prepared by adding the polymeric component to a mixer and mixing for 30 seconds after which time the N134 carbon black, N774 carbon black, and triphenyl phosphate was added. The resulting mixture was mixed until the temperature reached 130° C., at which point the mixture was dumped and cooled. The resulting masterbatch mixture and 1,3-benzene disulfonyl azide were added to the mixer and mixed until the temperature reached 105° C., at which point the resulting compound was dumped from the mixture and allowed to cool.

Example 34

|  | Amount (grams) |
|---|---|
| Masterbatch Components |  |
| Zeon Zetpol 2001EP | 210.33 |
| N134 carbon black | 63.10 |
| N774 carbon black | 189.30 |
| Triphenyl Phosphate | 21.03 |
| Masterbatch Dump Temperature: | 130° C. |
| Final Pass Components: |  |
| Masterbatch mixture | 4.94 |
| Trigonox 145-E85 |  |
| Final Pass Dump Temperature: | 105° C. |

For comparisons purposes, Example 34 was also prepared. Example 34 was prepared with the same method as used to prepare Example 33 with the same components at the same ratios, except for the curing agent. In Example 34, the azide curing agent of Example 33 was replaced with a peroxide curing agent, trigonox 145-E85.

Various physical properties of Example 33 and Example 34 were tested to provide a comparison of the physical properties of an elastomeric compound cured with an azide agent to those of an elastomeric compound cure with a peroxide agent. The results are provided in Table 7. Example 3 clearly shows substantially increased flex fatigue over the peroxide cured counterpart.

TABLE 7

|  |  |  | Example 33 | Example 34 |
|---|---|---|---|---|
| MV | ML(1 + 4) @ 100° C. T5 @ 100° C. | MU | 131.83 | 127.73 |
|  |  | Min | >120 | >120 |
| MDR 60' @160° C. | ML | dNm | 3.74 | 3.71 |
|  | MH | dNm | 26.19 | 28.05 |
|  | ts2 | Min | 0.83 | 2.04 |
|  | tc90 | Min | 22.97 | 46.95 |
|  | tan Delta |  | .22 | .20 |
| M V | ML(1 + 4) @ 100° C. T5 @ 100° C. | MU | 131.83 | 127.73 |
|  |  | min | >120 | >120 |
| MDR 60' @160° C. | ML | dNm | 3.74 | 3.71 |
|  | MH | dNm | 26.19 | 28.05 |
|  | ts2 | min | 0.83 | 2.04 |
|  | tc90 | min | 22.97 | 46.95 |
|  | tan Delta |  | 0.22 | 0.20 |

TABLE 7-continued

|  |  |  | Example 33 | Example 34 |
|---|---|---|---|---|
|  | Slab Cure | min@° C. | 45'@160° C. | 90'@160° C. |
|  |  | Shore A | 87 | 86 |
| Properties @ 25° C. | Durometer | psi | 2464 | 2765 |
|  | Tensile Strength | % | 271 | 190 |
|  | Elongation |  |  |  |
|  | 25% Modulus | psi | 676 | 667 |
|  | 50% Modulus | psi | 1021 | 1037 |
|  | 100% Modulus | psi | 1690 | 1788 |
|  | Tear Die-C | ppi | 261 | 181 |
|  | Trouser Tear | ppi | 65.4 | 39.6 |
| Hot Properties @121° C. | Tensile Strength | psi | 1302 | 1397 |
|  | Elongation |  |  |  |
|  |  | % | 210 | 157 |
|  | 25% Modulus | psi | 287 | 341 |
|  | 50% Modulus | psi | 410 | 513 |
|  | 100% Modulus | psi | 671 | 911 |
|  | Tear Die-C | ppi | 87 | 81 |
|  | Trouser Tear | ppi | 22.5 | 22.1 |
|  | Specimen Cure | min@° C. | 50'@160° C. | 95'@160° C. |
| DeMattia Flex | Cycles to 10 mm width |  | 2,375 | — |
|  | Cycles to 16 mm width |  | 7,500 | — |
|  | Final Crack Width | mm | 25.4 | 25.4 |
|  | Cycles to Final Width |  | 12,000 | 430 |

The above azide cured stator elastomers may be used to form a stator for a progressive cavity pump or motor. An initial step in a process to form an azide cure stator liner comprises mixing an uncured masterbatch elastomer. This step may comprise, for example, mixing all masterbatch components in a mixer and allowing the temperature to increase to a desired temperature. Typically, the mixing action of a mixture is sufficient to heat the mixture to the desired temperature. It is possible that the mixer needs to be cooled to prevent overheating caused by the mixing process. Nevertheless, if necessary, the mixer may also be heated by a heat source to heat the mixture to a desired temperature. For the examples described above, the temperature of the masterbatch without a curing agent warms to and is maintained mostly in the range of 100° C. to 150° C. during mixing. In an alternative embodiment, the range is 120° C.-135° C. Higher mixing temperatures in general allow for more thorough mixing of the masterbatch components as compared to mixing at lower temperatures. However, excess heat may result in degradation and scorching of the elastomer and masterbatch components.

After sufficient mixing of the masterbatch at a desired temperature and for a desired length of time, the masterbatch is allowed to cool. An azide curing agent and any additional final pass components are then added to the masterbatch. The final pass mixture may be further mixed in a mixer. In one embodiment, steps are taken to avoid or reduce the amount of an increase of the temperate of the final pass mixture caused by the mixing to avoid over-curing or scorching the elastomer. Examples of such steps include one or more of controlling mixing speed and cooling the mixture.

The resulting final pass elastomer with curing agent is then injected into a stator liner mold. The mold and injected final pass elastomer are then subjected to curing conditions to cure the elastomer. Typically, curing conditions involve elevated temperatures to promote the curing process. The entire mold/elastomer apparatus may be heated by any known means or method. Heating by bath immersion is one example. It offers the potential advantages, as compared with some other forms of heating, of allowing for more precise control of the curing temperature and more even and consistent temperatures throughout the elastomer during curing. Curing is typically performed in the range of 80° C.-120° C., and more preferably in the range of 95° C.-110° C. Excess heat during the curing process may result in scorching of the elastomer, especially with a curing agent present in the mixture. Curing times may vary, but typically are in the range of 1-5 hours, and more preferably in the range of 2-4 hours.

Once curing is completed, the curing process is quenched by cooling the mold/elastomer assembly and the resulting stator liner is removed from the mold.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore contemplated that the claims will cover any such modifications or embodiments that fall within the true scope of the invention.

What is claimed is:

1. A stator compound for a progressive cavity pump or progressive cavity motor stator comprising:
   at least one elastomeric component that has been cured with a first curing agent that is a diazide, wherein the at least one elastomeric component is selected from the group consisting of HNBR, NBR, FKM, CR, EPDM, ECO and combinations thereof, and wherein the first curing agent is 1,3 benzene disulfonyl azide (1,3 BDSA);
   at least one reinforcing filler; and
   a triphenyl phosphate plasticizer.

2. The stator compound of claim 1 in which the first curing agent has a concentration of about 0.05 phr to about 10 phr.

3. The stator compound of claim 1 in which the first curing agent has a concentration of about 0.2 phr to about 4.5 phr.

4. The stator compound of claim 1 in which one of the at least one reinforcing filler is selected from a group consisting of carbon black, silica, and clay.

5. The stator compound of claim 4 in which the at least one reinforcing filler is carbon black.

6. The stator compound of claim 5 in which the concentration of the carbon black is about 10 phr to about 100 phr.

7. The stator compound of claim 1 further comprising a second curing agent.

8. The stator compound of claim 7 in which the second curing agent is selected from a group consisting of a diazide that is different from the first curing agent, a sulfur-based curing agent, and a peroxide-based curing agent.

9. The stator compound of claim 1 further comprising an accelerator.

10. The stator compound of claim 1 further comprising an activator.

11. A stator compound for a progressive cavity pump or progressive cavity motor stator comprising:

at least one elastomeric component that has been cured with a first curing agent that is a diazide, wherein the at least one elastomeric component is selected from the group consisting of HNBR, NBR, FKM, CR, EPDM, ECO and combinations thereof;

at least one reinforcing filler;

a second curing agent; and a triphenyl phosphate plasticizer.

12. The stator compound of claim 11 in which the first curing agent has a formula of $N_3$-A-R—B-$N_3$, wherein:
   A is a substituted methylene group, an unsubstituted methylene group, a substituted benzyl group, an unsubstituted benzyl group, a substituted benzylidene group, or a unsubstituted benzylidene group; and
   B is a substituted methylene group, an unsubstituted methylene group, a substituted benzyl group, an unsubstituted benzyl group, a substituted benzylidene group, or a unsubstituted benzylidene group;
   R is a linear, branched, or cyclic alkylene group of 1 to 20 carbon atoms, optionally comprising one or more heteroatoms.

13. The stator compound of claim 12 in which the first curing agent has a concentration of about 0.05 phr to about 10 phr.

14. The stator compound of claim 12 in which the first curing agent has a concentration of about 0.2 phr to about 4.5 phr.

15. The stator compound of claim 11 in which one of the at least one reinforcing filler is selected from a group consisting of carbon black, silica, and clay.

16. The stator compound of claim 15 in which the at least one reinforcing filler is carbon black.

17. The stator compound of claim 16 in which the concentration of the carbon black is about 10 phr to about 100 phr.

18. The stator compound of claim 11 in which the first curing agent is selected from a group consisting of 1,3 benzene disulfonyl azide (1,3 BDSA), 1,12-diazidododecane, 1,16-diazidohexadecane, and 2,6-bis(4-azidobenzylidene)-4-methylcyclohexanone.

19. The stator compound of claim 11 in which the second curing agent is selected from a group consisting of a diazide that is different from the first curing agent, a sulfur-based curing agent, and a peroxide-based curing agent.

20. The stator compound of claim 11 further comprising an accelerator.

21. The stator compound of claim 11 further comprising an activator.

22. A stator compound for a progressive cavity pump or progressive cavity motor stator comprising:

at least one elastomeric component that has been cured with a first curing agent that is a diazide, wherein the at least one elastomeric component is selected from the group consisting of HNBR, NBR, FKM, CR, EPDM, ECO and combinations thereof;

at least one reinforcing filler; and a triphenyl phosphate plasticizer.

23. The stator compound of claim 22 in which the first curing agent has a formula of $N_3$-A-R—B-$N_3$, wherein:
   A is a substituted methylene group, an unsubstituted methylene group, a substituted benzyl group, an unsubstituted benzyl group, a substituted benzylidene group, or a unsubstituted benzylidene group; and
   B is a substituted methylene group, an unsubstituted methylene group, a substituted benzyl group, an unsubstituted benzyl group, a substituted benzylidene group, or a unsubstituted benzylidene group;
   R is a linear, branched, or cyclic alkylene group of 1 to 20 carbon atoms, optionally comprising one or more heteroatoms.

24. The stator compound of claim 23 in which the first curing agent has a concentration of about 0.05 phr to about 10 phr.

25. The stator compound of claim 23 in which the first curing agent has a concentration of about 0.2 phr to about 4.5 phr.

26. The stator compound of claim 22 in which one of the at least one reinforcing filler is selected from a group consisting of carbon black, silica, and clay.

27. The stator compound of claim 26 in which the at least one reinforcing filler is carbon black.

28. The stator compound of claim 27 in which the concentration of the carbon black is about 10 phr to about 100 phr.

29. The stator compound of claim 22 in which the first curing agent is selected from a group consisting of 1,3 benzene disulfonyl azide (1,3 BDSA), 1,12-diazidododecane, 1,16-diazidohexadecane, and 2,6-bis(4-azidobenzylidene)-4-methylcyclohexanone.

30. The stator compound of claim 22 further comprising a second curing agent.

31. The stator compound of claim 30 in which the second curing agent is selected from a group consisting of a diazide that is different from the first curing agent, a sulfur-based curing agent, and a peroxide-based curing agent.

32. The stator compound of claim 22 further comprising an accelerator.

33. The stator compound of claim 22 further comprising an activator.

* * * * *